United States Patent [19]

Pearman et al.

[11] Patent Number: 4,592,770
[45] Date of Patent: Jun. 3, 1986

[54] GLASS MELTER

[75] Inventors: William O. Pearman, Nashville; Joseph L. Hunt, Brentwood; William P. Cunningham, Thompson Station, all of Tenn.

[73] Assignee: GAF Corporation, Wayne, N.J.

[21] Appl. No.: 620,885

[22] Filed: Jun. 15, 1984

[51] Int. Cl.$^4$ .............................................. C03B 5/26
[52] U.S. Cl. ..................................... 65/128; 65/134; 65/135; 65/327; 65/337
[58] Field of Search ................. 65/138, 136, 135, 337, 65/126, 128, 327; 373/30, 35

[56] References Cited

U.S. PATENT DOCUMENTS

| | | |
|---|---|---|
| 1,853,842 | 4/1932 | Bates et al. |
| 1,956,171 | 4/1934 | Hitner ........................................ 13/6 |
| 2,186,718 | 1/1940 | Ferguson . |
| 2,255,578 | 9/1941 | Baker . |
| 2,350,829 | 6/1944 | Scharfnagel . |
| 2,754,346 | 7/1956 | Williams . |
| 2,919,297 | 12/1959 | Augsburger . |
| 3,063,268 | 11/1962 | Knisely ............................... 65/187 |
| 3,078,695 | 2/1963 | Kozak et al. ........................ 65/183 |
| 3,109,045 | 10/1963 | Silverman ................................. 13/6 |
| 3,145,246 | 8/1964 | Augsburger ............................. 13/6 |
| 3,160,492 | 12/1964 | Chapman et al. ..................... 65/128 |
| 3,244,495 | 4/1966 | Apple et al. ........................... 65/161 |
| 3,376,373 | 4/1968 | Le Clerc de Bussy .................. 13/6 |
| 3,429,972 | 2/1969 | Le Clerc de Bussy et al. ......... 13/6 |
| 3,554,727 | 1/1971 | Stevenson ............................. 65/327 |
| 3,580,976 | 5/1971 | Le Clerc de Bussy ............... 373/35 |
| 3,912,477 | 10/1975 | Brady et al. ..................... 65/356 X |
| 4,213,002 | 7/1980 | Pieper ..................................... 13/6 |
| 4,247,320 | 1/1981 | Bansal et al. ......................... 65/136 |
| 4,365,986 | 12/1982 | Nayak ................................... 65/136 |

Primary Examiner—Arthur Kellogg
Attorney, Agent, or Firm—Marilyn J. Maue; Joshua J. Ward

[57] ABSTRACT

The glass melter has an outlet portion formed as a heating device for controlling the outlet flow rate of molten glass from the melter. Raw batch material that is used to form the molten glass is heated to a molten state at a first temperature range. The molten glass, while flowing toward the outlet of the melter, is cooled to a second temperature range to increase the viscosity of the molten glass to a desired level. The outlet member then heats the exiting molten glass a predetermined amount to decrease the glass viscosity in accordance with desired flow rate requirements. Heating of the outlet member is accomplished by imposing a relatively low voltage and a relatively high amperage on the outlet member. Accordingly, by using the outlet member as a heater a controlled flow rate of molten glass from the melter is achieved.

18 Claims, 7 Drawing Figures

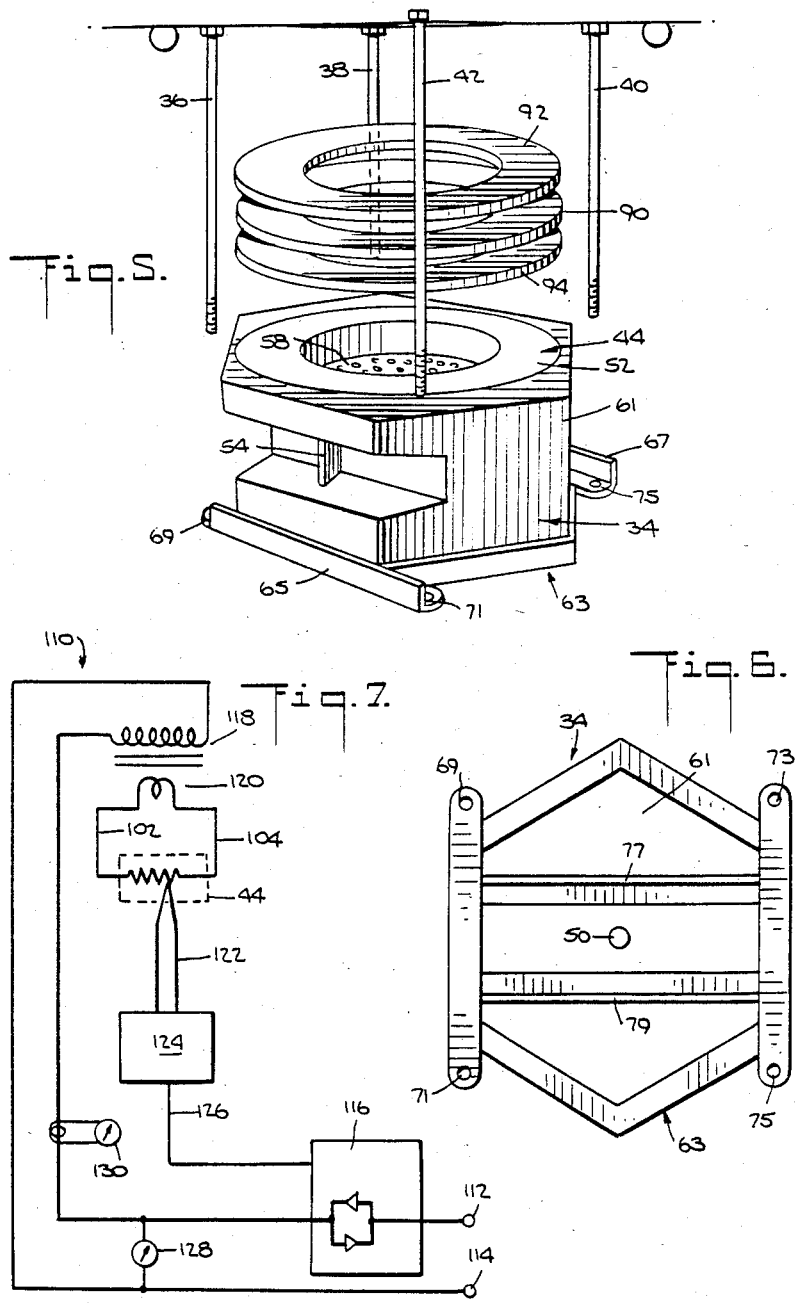

GLASS MELTER

BACKGROUND OF THE INVENTION

This invention relates to glass melters and more particularly to a glass melter having an outlet portion formed as a heating device for controlling the outlet flow rate of molten glass from the melter.

Glass melters, especially those used for the production of glass fibers, generally operate continuously, twenty-four hours a day, seven days a week. However during such continuous operation, the output flow of molten glass from the melter must be varied in accordance with fluctuating demands beyond the melter, as for example, at a forehearth.

The forehearth, in a glass fiber forming operation, normally receives molten glass from a refiner that is in series with the melter. The refiner receives the entire output of molten glass from the melter and passes such output onward to the forehearth. The forehearth thus accepts a continuous outlet or output flow of molten glass from the melter and distributes such output to a series of glass fiber forming bushings.

Each bushing in series of glass fiber forming bushings contains a plurality of orifices from which the glass fibers are drawn, as disclosed in U.S. Pat. No. 4,146,375. Glass fibers or filaments from the bushing are gathered into a strand that is wound around a collet.

Generally, the outlet flow from the glass melter is capable of fulfilling the demand for molten glass by a predetermined maximum number of glass fiber forming bushings that each have a set number of potentially operable glass fiber forming orifices. However, since the orifices in a glass fiber forming bushing are relatively small, one or more such orifices may become clogged or otherwise fail to operate, thereby decreasing the glass fiber output of one of the bushings in a series.

Thus the output from the glass fiber forming bushings can fluctuate due to operational problems at one or more orifices. Such problems can last for varying time periods. On occasion, it may be necessary to shut down a complete bushing, resulting in a distinct decrease in the amount of molten glass needed by the forehearth. Therefore it is necessary to decrease the outlet flow from the glass melter to compensate for any decreases in demand at the forehearth.

Since servicing of an inoperable bushing is not always immediate, the decreased demand for molten glass at the forehearth may exist for a prolonged period of time. Furthermore there are instances when more than one bushing, in a series of several bushings, must be cut off from receiving a flow of molten glass.

The withdrawal of more than one bushing from the fiber forming operation usually results in a substantial curtailment of demand for molten glass at the forehearth in comparison to the maximum potential demand when all of the bushings are operating at their rated capacity.

The magnitude of any change in demand for molten glass by the forehearth must therefore be recognized and responded to at the glass melter, such as by a flow control means incorporated in the melter. Ideally, the flow control means for a glass melter should be capable of accurately responding to wide variations in demand for molten glass at operating stations in series with the melter.

One known approach for controlling the flow of molten glass from a glass melter to a forehearth, includes the use of a needle or plunger type valve as shown in U.S. Pat. Nos. 3,580,976 and 3,659,029. Flow control by such needle or plunger valves is accomplished by varying the position of a tapered shaft in a fixed diameter tube to restrict or vary the rate of flow of molten glass through the tube.

The known needle valve arrangements require use of exotic and extremely expensive materials, such as molybdenum or molybdenum alloys, which have a limited tolerance for withstanding the hostile environment in the glass melter without contaminating the molten glass. Eventually however a wearing away of the needle valve parts occurs, which adversely affects the flow control function of such valve. It thus becomes necessary to shut down the glass melter for several days to repair and/or replace the worn out needle valve assembly. Since the glass melter is most efficient when it operates continuously, any shutdown is extremely costly.

At present the needle-type valve arrangement for controlling the outlet flow of molten glass from a melter has provided the only feasible solution to the problem of dealing with a wide range of demand for molten glass by the forehearth that is in series with a glass melter.

It is thus desirable to provide a flow control system for a glass melter that furnishes a wide range of control without requiring a flow restricting valve for accomplishing such control.

OBJECTS AND SUMMARY OF THE INVENTION

Among the several objects of the invention may be noted the provision of a novel glass melter, a novel glass melter that accomplishes a wide range of outlet flow control without the need for a control valve that physically restricts the outlet flow, a novel glass melter that incorporates an outlet portion of the melter as a heating device, a novel glass melter having a detachable outlet portion that is used as a heating device, and a novel method for controlling the flow of glass from a glass melter.

Other objects and features will be in part apparent and in part pointed out hereinafter.

In accordance with the present invention, a glass melter is provided with an outlet portion that is used as a heating device to accomplish a wide range of flow control from the melter to a forehearth.

In a preferred embodiment of the invention, the melter includes a melter body defining a containment chamber for receiving raw batch material. Melting means are provided in the containment chamber for heating the raw batch material to a molten glass state. Outlet heating means in the form of an outlet member having an outlet opening of predetermined size is detachably secured to the melter body. Preferably the outlet member is formed of platinum.

Guide means are provided in the containment chamber to direct the flow of glass from the containment chamber to the outlet member. The guide means include a downcomer member that is spaced from the melting means, which downcomer member leads to the outlet member.

A cooling means is provided at a joint between the melter body and the outlet member, which cools the molten glass a predetermined amount after it has been initially heated. The cold joint increases the viscosity of the molten glass to a predetermined level just as it enters the outlet member.

Heating of the outlet member is accomplished by imposing a relatively low voltage and a relatively high amperage on the outlet member. The heating means for the outlet member includes a temperature control for controlling the amount of heat generated by the outlet member.

The molten glass flowing from the melter is thus heated by the outlet member to a predetermined temperature that corresponds to a desired glass viscosity. In this manner the flow rate of molten glass through the outlet opening is controlled by controlling the glass viscosity.

Flow of molten glass from the glass melter is thus varied in accordance with fluctuating demand by using the outlet member to heat the molten glass preselected amounts as it exits from the glass melter. Except for the heat that is imposed on the outlet member, no physical restriction is employed to vary the rate of flow of molten glass through the outlet member. Thus by using the outlet member as a heater a controlled flow rate of molten glass from the melter is achieved that is substantially equivalent to the range of flow control obtained by a needle valve.

The invention accordingly comprises the constructions and methods hereinafter described, the scope of the invention being indicated in the claims.

DESCRIPTION OF THE DRAWINGS

In the accompanying drawings, in which one embodiment of the invention is illustrated.

FIG. 5 is an exploded perspective view of the anchoring arrangement for the flow control outlet means;

FIG. 6 is a bottom view of the flow control outlet means; and

FIG. 7 is a control circuit for the flow control outlet means.

Corresponding reference characters indicate corresponding parts in the several views of the drawings.

DETAILED DESCRIPTION OF THE INVENTION

Figure 1:
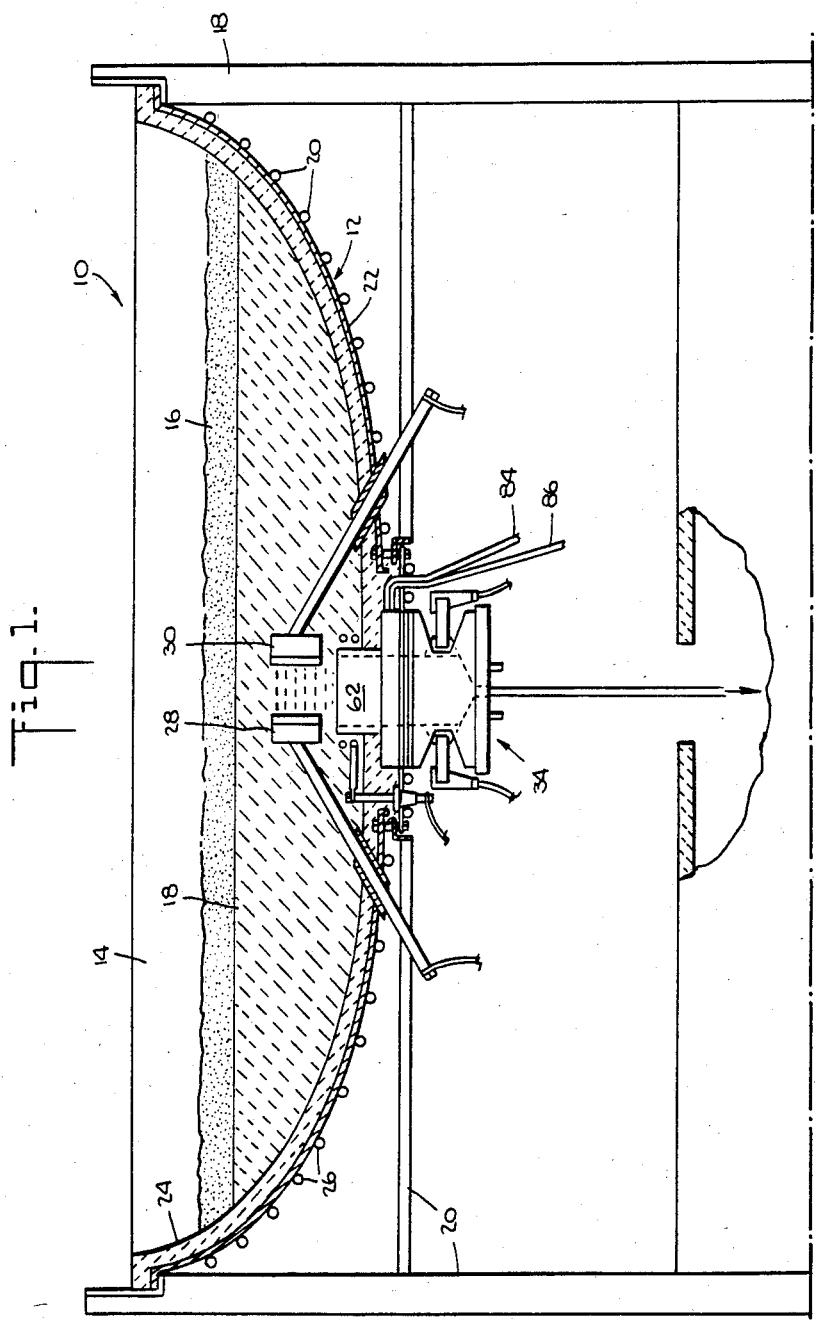
FIG. 1 is an elevational view of a glass melter, partly shown in section, incorporating one embodiment of the invention.

A glass melter incorporating a preferred embodiment of the invention is generally indicated by the reference number 10 in FIG. 1.

The glass melter 10 comprises a tub-like melter body 12 that defines a containment chamber 14 for receiving raw batch material 16. The raw batch material is melted by electrodes 28, 30 and 32 to form molten glass 18. The electrodes 28, 30 and 32, which are spaced at 120 degree intervals, can be of the type shown in U.S. Pat. No. 3,580,976. The raw batch material 16 can be, for example, a known blend of sand, clay, limestone, dolomite and fluxes. The containment chamber 14 is sized to hold a predetermined volume of the molten glass 18.

The melter body 12 is supported in any suitable known fashion by a frame 20 which, for example, can be of the type shown in U.S. Pat. No. 3,147,328. The melter body 12 includes an outer shell 22 preferably formed of copper and an interior liner 24 of refractory material 24 such as zircone, zirconia, clay, alumina and a binder. Coolant such as water, flows through tubes 26 brazed or otherwise adhered to the outer surface of the shell 22.

The type of feed arrangement for dispensing the raw batch material 16 onto the surface of the molten glass 18 in the containment chamber 14 is a matter of choice and has been omitted to simplify the drawings. Generally however the feed arrangement provides a continuous deposition of raw batch material 16 into the melter 10 to maintain a predetermined level of molten glass in the containment chamber 14.

Figure 2:
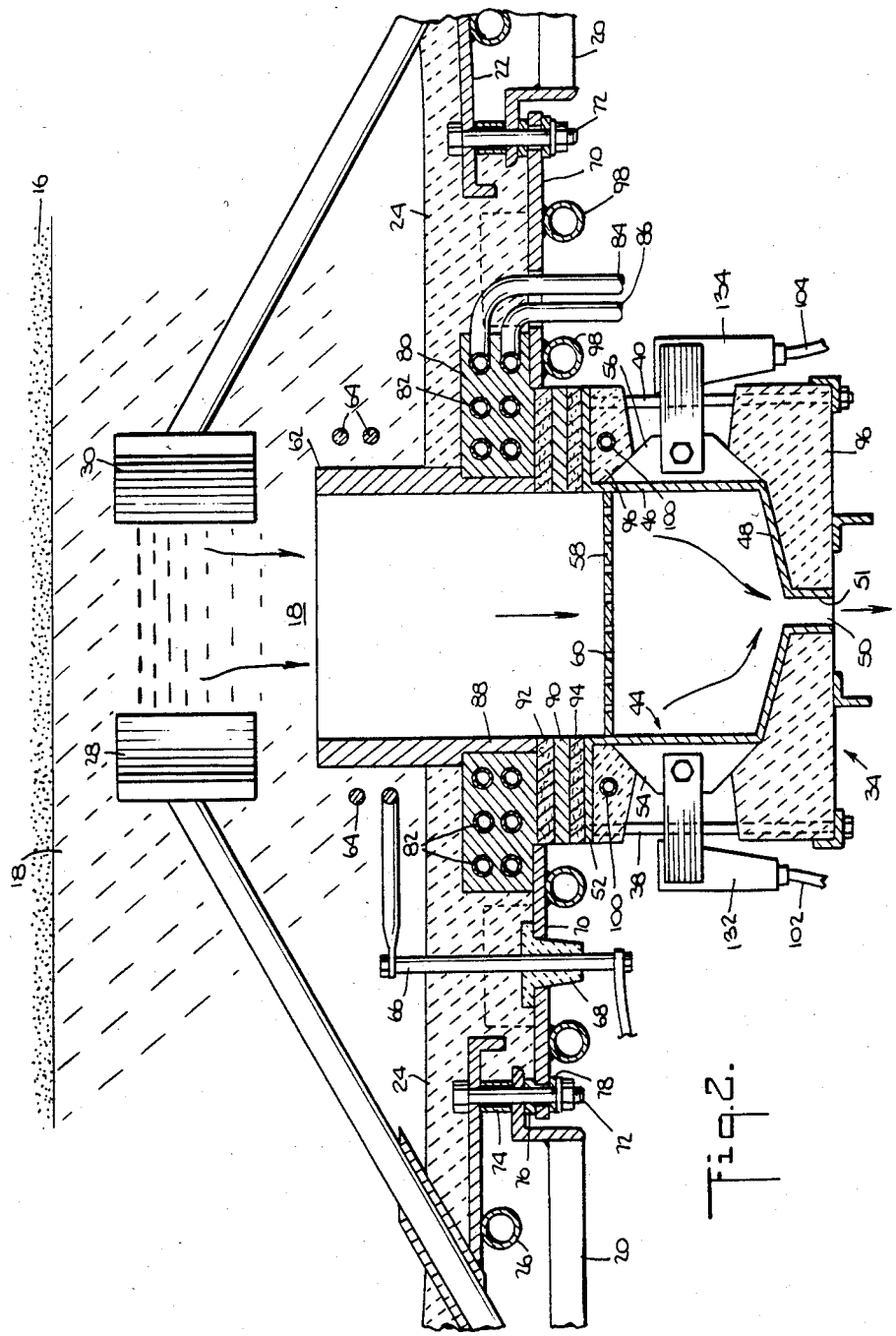
FIG. 2 is an enlarged fragmentary sectional view of the outlet flow guide means, and the flow control outlet means thereof.
Figure 3:
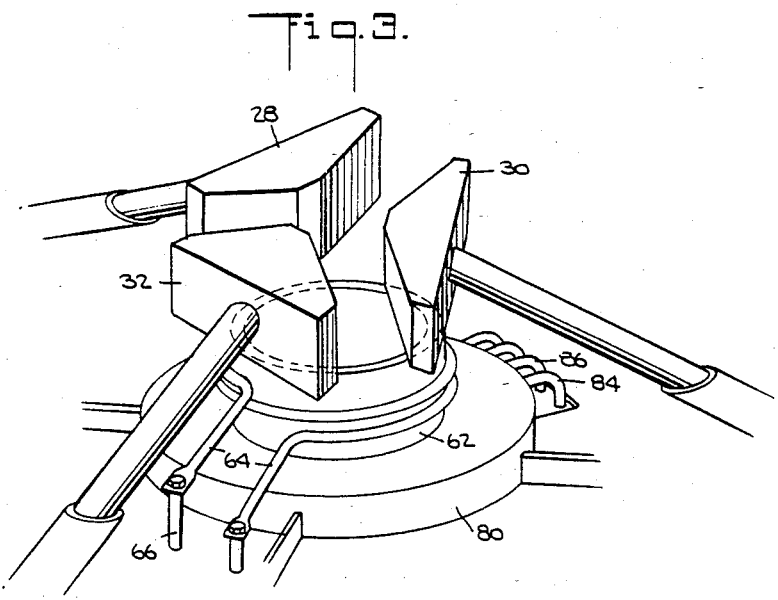
FIG. 3 is a perspective view of the melting structure relative to the outlet flow guide means.
Figure 4:
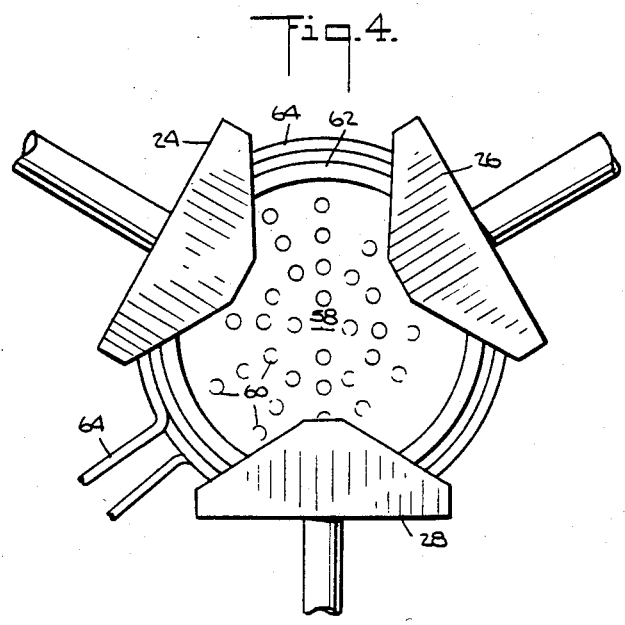
FIG. 4 is a top view of the structure shown in FIG. 3.

Referring to FIGS. 1, 2 and 5, the melter 10 includes a flow control outlet assembly 34 detachably secured to the melter body 12 by bolts 36, 38, 40 and 42. As most clearly shown in FIG. 2, the outlet assembly 34 includes outlet heating means in the form of an outlet member 44 preferably made of platinum. The outlet member 44, in the general form of a top hat, has a generally cylindrical wall portion 46 and a sloping base 48 provided with a central outlet opening 50 in an orifice tube 51. If desired the wall portion 46 can be formed to incline slightly toward the central outlet opening 50.

An annular flange 52 is formed at an inlet end of the member 44, and oppositely disposed terminal portions 54 and 56 project from the wall portion 46 of the outlet member 44. A screen 58, having a plurality of openings 60, is provided across the inlet end of the member 44. The screen 58, the terminal portions 56 and the annular flange 52 are integral parts of the outlet member 44 and are likewise formed of platinum.

The outlet assembly 34 also includes a generally hexagonal casing of refractory material 61, which encapsulates substantially the entire outlet member 44, except for the terminal portions 54 and 56, and the annular flange 52. A generally hexagonal support frame 63 is provided around the periphery of refractory material 61 at a base end of the outlet assembly 34. A pair of oppositely disposed portions 65 and 67 of the support frame 63 have end portions that extend beyond the hexagonal confines of the frame 63. The portion 65 includes openings 69 and 71 for accommodation of the bolts 36 and 42, whereas the portion 67 includes openings 73 and 75 for accommodation of the bolts 38 and 40. A pair of cross members 77 and 79, L-shaped in cross section, join the portions 65 and 67 as shown in FIG. 6. Under this arrangement the bolts 36, 38, 40 and 42 which connect the outlet assembly 34 to the melter body 12 are insulated from the outlet member 44 by the refractory material 61.

Before reaching the outlet member 44 the molten glass 18 is guided along an outlet path from the melter 10 at the hottest region in the containment chamber 14 by a downcomer member 62. The downcomer member 62 is of general cylindrical shape, substantially continuous with the outlet member 44, and is preferably formed of molybdenum.

A heater coil 64 preferably formed of molybdenum surrounds the downcomer member 62. The heater coil 64 is supported on a conductive post 66 that extends through an insulator member 68. The insulator member 68 is arranged on an annular support plate 70 also preferably formed of molybdenum. The support plate 70 is secured to the frame 20 by a plurality of bolts 72 spaced around the circular periphery of the support plate 70.

The bolts 72 likewise interconnect the shell 22 with the frame 20 and include appropriate spacers 74, 76 and 78.

A support collar 80, preferably formed of brass, is secured to the support plate 70 in any suitable known fashion such as by bolts (not shown). A series of tubes 82 is arranged to pass through the support collar 80 for circulation of coolant, such as through inlet and outlet tubes 84 and 86, for example. The inside diameter of the support collar 80 is sized to accommodate a reduced outside diametrical portion 88 of the downcomer member 62.

A gasketing arrangement provided between the outlet member 44 and the melter body 12 includes a layer of Green cast material 90 sandwiched between two layers 92 and 94 of Fiberfrax material. Thus the gasketing arrangement 90, 92 and 94 serves to electrically and thermally insulate the outlet member 44 from the melter body 12.

Coolant tubes 98, similar to the coolant tubes 26 are secured to the underside of the support plate 70. In addition, a coolant tube 100 is provided in the refractory material 96 of the outlet assembly 34 at the inlet portion of the member 44.

The power supply for the electrodes 28, 30 and 32 as well as the power supply for the heater coil 64 are conventional and are separate from the power supply for the outlet member 44.

An operating circuit for the outlet member 44 is generally indicated by the reference number 110 in FIG. 7. The circuit 110 is provided with 480 volts of power across primary terminals 112 and 114. This voltage is fed through a power pack 116 that includes two silicon control rectifiers in inverse parallel. The power pack 116 is of the type sold by Electronic Control Systems of Fairmont, W. Va., under the designation ECS 7550. A primary coil 118 of a water cooled transformer is connected to the power pack 116, and a secondary coil 120 is connected by the conductors 102 and 104 to the outlet member 44 of the glass melter 10.

The outlet member 44 is furnished with a type R thermocouple 122 that is fed to a controller 124, which is of the type sold by Electronic Control Systems under the designation ECS 6210. The output of the controller is fed through any suitable known firing circuit (not shown) and is connected by a conductor 126 to the power pack 116. A voltmeter 128 is connected across the primary coil 118 and a current transformer and ampere meter 130 is connected in series with the primary coil 118.

The power pack 116 serves to adjust the voltage to the primary coil 118, and thereby vary the voltage at the secondary coil 120. The secondary coil 120 provides a relatively low voltage and relatively high current supply for the outlet member 44, which acts electrically as a resistor. The secondary coil 120 is connected by suitable water cooled connectors 132 and 134 to the terminals 54 and 56 of the outlet member 44.

The heat that is generated by the outlet member 44 corresponds to the voltage and current imposed upon the outlet member 44 by the secondary coil 120. Accordingly, as the voltage and current at the secondary coil 120 increases, an increased amount of heat is dissipated by the outlet member 44. The thermocouple 122, in response to the heat imposed on the outlet member 44 furnishes a signal that is fed to the controller 124, which acts upon the power pack 116 to control the power fed to the outlet member 44.

In operation of the glass melter 10 the raw batch material 16 is continuously deposited into the containment chamber 14 onto the surface of the molten glass 18. An electric current that is passed between the electrodes 28, 30 and 32 and through the molten glass 18 melts the glass by direct heating. For example, the temperature of the molten glass between the electrodes is in the range of approximately 3500° to 4000° F.

Occasionally foreign particles or other impurities collect in the containment chamber 14 and ordinarily sink to the bottom of the molten bath. The downcomer member 62 extends above the refractory liner 24 to avoid receiving any non-glass constituents in the outlet flow path defined by the downcomer 62 and the outlet member 44.

It is believed that the flow pattern of molten glass 18 outside the downcomer 62 is directed upward by the downcomer whereby the glass 18 drawn into the downcomer 62 and conveyed to the outlet member 44 is at a higher temperature than the glass 18 that is adjacent the refractory liner 24.

As the molten glass 18 enters the downcomer 62 it passes the heater coil 64 which operates primarily during the initial startup of the melter 10 or anytime the glass flow is stopped and must be reestablished. Thus during normal operation of the melter 10 no heat is provided to the downcomer by the coil 64.

Referring particularly to FIG. 2, the molten glass 18, as it flows downwardly to the level of the support collar 80 and the cooling tubes 82 therein, which constitute a cold joint, undergoes an increase in viscosity. The purpose of the cold joint is to deal with the possibility of the molten glass 18 which enters the downcomer 62 being so hot that a so-called runaway condition would occur, which would defeat the purpose of the heating function of the outlet assembly 34. Therefore the cold joint, constituted by the support plate 80 and the cooling tubes 82 insures that a runaway condition does not occur. The cold joint also prevents glass from flowing between the downcomer and the support plate 70, as well as between the downcomer 62 and the Fiberfrax layer 92. The cold joint also prevents glass from leaking between the layers 92, 90 and 94 and thus provides a sealing function.

The primary purpose of the Fiberfrax layers 92, 94 and the Green cast layer 90 is to function as an electrical insulator between the downcomer 62 and the outlet member 44.

It should be noted that the power input to the electrodes can vary from 450 kilowatts to approximately 800 kilowatts depending upon the particular glass formulation. Under the circumstances, the downcomer 62 can potentially be at a voltage of over 100 volts due to the conduction of electricity between the glass 18 and the electrodes 28, 30, 32, and through the glass 18 between the electrodes 28, 30, 32 and the downcomer 62. Therefore it is necessary to electrically isolate the outlet member 44 from the downcomer 62 as the outlet member 44 employs voltages of the order of 3 to 4 volts and amperage of the order of 2500 to 10,000 amps.

As the molten glass 18 enters the outlet member 44 it passes through the screen 58 which helps to prevent any large foreign particles that may inadvertently have passed into the downcomer 62 from passing through the outlet member 44. The function of the outlet member 44 is to reheat the molten glass 18 to increase its temperature to whatever level is needed in order to achieve a desired glass viscosity and a corresponding flow rate of the molten glass from the outlet opening 50.

If the viscosity of the molten glass 18 entering the outlet member 44 were too low, then further heating of the glass by the outlet member 44 would not provide any desired viscosity correction. Accordingly there would be an uncontrolled or runaway flow condition.

The outlet member 44 operates on a principle of receiving molten glass that is slightly cooler than desired and further heats the glass to raise the temperature and reduce the viscosity to desired predetermined levels. The glass viscosity can be accurately established by imposing predetermined voltage and current levels on the outlet member 44.

For example, with a melter body approximately two meters in diameter, and having a potential yield of 2000 metric tons per year, it is feasible to structure the outlet member 44 with an overall height from the annular flange 52 to the sloping base 48 of approximately 4 inches and an inside diameter of approximately $6\frac{1}{2}$ inches. The annular flange 52 can have an outer diameter of approximately $10\frac{1}{2}$ inches.

The sloping base 48 has a vertical drop of approximately 1 inch from the end of the cylindrical wall 46 to the outlet opening 50. The orifice tube 51, which defines the outlet opening 50, can be approximately $\frac{3}{4}$ inches long and have an inside diameter of approximately $\frac{1}{2}$ inch.

Preferably the thickness of the platinum material which forms the outlet member 44 is approximately 0.060 inches thick whereas a 0.050 inch thickness can be used to form the sloping base 48. The terminal portions 54 and 56 can be approximately $1\frac{7}{8}$ inches thick. The annular flange can have a thickness of approximately 0.020 inches and the screen has a thickness of approximately 0.050 inches, with the openings in the screen 58 being approximately $\frac{1}{2}$ inch in diameter.

Under this arrangement it is possible to control the flow rate of molten glass from the glass melter to a forehearth (not shown) which feeds up to eighteen glass fiber forming bushings (not shown) each containing in excess of one hundred glass fiber forming orifices.

Continuity of production can thus be maintained even though one or more glass fiber forming bushings (not shown) are entirely shut down from the operation. The fluctuating demands by the forehearth (not shown) are entirely compensated for by varying the heat generated by the outlet member 44 to provide a flow control that is based upon the viscosity of the molten glass flowing through the orifice 50 rather than upon any physical restriction to the flow rate as previously relied on.

In view of the above, it will be seen that the several objects of the invention are achieved and other advantageous results attained.

As various changes can be made in the above constructions and methods without departing from the scope of the invention, it is intended that all matter contained in the above description or shown in the accompanying drawings shall be interpreted as illustrative and not in a limiting sense.

What is claimed is:

1. A glass melter comprising, a melter body defining a containment chamber for receiving raw batch material, melting means in said chamber for heating said raw batch material to a molten glass state, an outlet member for said melter body defining an outlet flow path and having an outlet opening of predetermined size, guide means inside said containment chamber but above said outlet member and insulated from said outlet member for directing the flow of molten glass to said outlet member, cooling means positioned so as to cool glass in said guide means electrical power means communicating directly with said outlet member such that said outlet member acts as a resistance and heats up in accordance with the amount of electric power furnished by said power supply means to said outlet member, and temperature control means communicating with said outlet member and said power supply means for controlling the amount of heat buildup in said outlet member to control the viscosity of the molten glass along said outlet flow path and passing through said outlet opening, whereby the resistive heating of said outlet member is used without any flow restricting valves to control the outlet flow rate of said molten glass from said melter body.

2. The glass melter as claimed in claim 1, wherein the outlet opening of said outlet member has a first cross sectional area and the outlet member has an inlet opening for receiving the flow of molten glass from said guide means, which inlet opening has a second cross sectional area that is greater than the first cross sectional area of said outlet opening.

3. The glass melter as claimed in claim 2, wherein said outlet member is substantially continuous with said guide means.

4. The glass melter as claimed in claim 1, wherein said outlet member is detachably secured to said melter body.

5. The glass melter as claimed in claim 1, wherein said melter body has an outside surface and said outlet member is detachably secured to the outside surface of said melter body.

6. The glass melter as claimed in claim 2 wherein said guide means include a downcomer member spaced from said melting means and leading to said outlet member.

7. The glass melter as claimed in claim 6, wherein the downcomer, and the inlet opening of the outlet member are substantially free of any obstruction, thereby enabling unrestricted flow of the molten glass into the outlet member.

8. The glass melter as claimed in claim 6, wherein said downcomer has an inlet end and an outlet end, and said cooling means include a cooling zone at the outlet end of said downcomer.

9. The glass melter as claimed in claim 8, wherein insulating means are provided between said outlet member and said melter body to electrically and thermally insulate said outlet member from said melter body.

10. The glass melter as claimed in claim 1, wherein said electrical power means connects to a transformer that imposes a relatively low voltage and a relatively high amperage on said outlet member to maintain the molten glass passing through the outlet opening of the outlet member at said predetermined temperature.

11. The glass melter as claimed in claim 10, wherein said transformer includes a control means that is electrically independent of from said melting means.

12. The glass melter as claimed in claim 11 wherein said cooling means cooperate with the power means to control the viscosity of said molten glass passing through the outlet opening of the outlet member.

13. The glass melter as claimed in claim 10, wherein said outlet member is formed of platinum.

14. The glass melter as claimed in claim 1 wherein said outlet member is formed as a one piece structure.

15. A method of preparing molten glass comprising, continuously melting raw batch material to a first molten glass state, maintaining the molten glass in a containment chamber, establishing an outlet flow path from the containment chamber through guide means to an outlet member which is insulated from the guide means to limit heat exchange between the guide means and the outlet member, flowing the molten glass from the containment chamber to the outlet member, and varying the rate of flow of the molten glass through the outlet member by initially cooling the glass in the guide means and then using the outlet member as a resistance to accomplish an electrical heat buildup in the outlet member to heat the outlet member to control the viscosity of the molten glass passing through the outlet member, whereby the resistive heating of the outlet member is used without any flow restricting valves to control the outlet flow rate of molten glass from the containment chamber.

16. The method of claim 15 wherein a relatively low voltage, and a relatively high amperage are imposed upon the outlet member to heat the outlet member.

17. The method of claim 16 wherein the relatively low voltage is in the range of 2 to 4 volts and the relatively high amperage is in the range of 2500 to 10,000 amperes.

18. The method of claim 15 wherein the outlet member is formed of platinum.

* * * * *